(12) United States Patent
Haraguchi

(10) Patent No.: US 9,609,256 B2
(45) Date of Patent: Mar. 28, 2017

(54) SOLID-STATE IMAGE SENSOR, METHOD OF CONTROLLING THE SAME, AND STORAGE MEDIUM

(71) Applicant: CANON KABUSHIKI KAISHA, Tokyo (JP)

(72) Inventor: Kazuki Haraguchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 14/635,399

(22) Filed: Mar. 2, 2015

(65) Prior Publication Data

US 2015/0256779 A1    Sep. 10, 2015

(30) Foreign Application Priority Data

Mar. 4, 2014    (JP) .................................. 2014-041942

(51) Int. Cl.
*H04N 5/378*    (2011.01)
*H04N 5/374*    (2011.01)
*H04N 5/3745*   (2011.01)

(52) U.S. Cl.
CPC ......... *H04N 5/378* (2013.01); *H04N 5/37457* (2013.01)

(58) Field of Classification Search
CPC ........................... H04N 5/378; H04N 5/37455
See application file for complete search history.

(56) References Cited

U.S. PATENT DOCUMENTS

| 2009/0128678 A1* | 5/2009 | Kitami | H04N 5/23245 348/308 |
| 2010/0230583 A1* | 9/2010 | Nakata | H01L 27/14621 250/227.2 |
| 2013/0057743 A1* | 3/2013 | Minagawa | H04N 5/35563 348/302 |
| 2013/0057744 A1* | 3/2013 | Minagawa | H04N 5/35563 348/311 |
| 2013/0100326 A1* | 4/2013 | Ueno | H04N 5/357 348/300 |

FOREIGN PATENT DOCUMENTS

| JP | 2004-134867 A | 4/2004 |
| JP | 2010-056707 A | 3/2010 |

* cited by examiner

*Primary Examiner* — Gevell Selby
(74) *Attorney, Agent, or Firm* — Cowan, Liebowitz & Latman, P.C.

(57) ABSTRACT

A solid-state image sensor comprises unit pixels, each unit pixel including photodiodes, transfer switches, a floating diffusion portion, and reset means, and an AD converter, wherein the AD converter includes a reference signal generator and a comparator that compares the reference signal and analog signal and vary an output depending on a magnitude relationship, the floating diffusion portion accumulates a first signal obtained by transferring a signal of at least one of the photodiodes, and adds, to the first signal, a second signal obtained by transferring a signal of at least one of the photodiodes, and the AD converter operates in a first AD conversion mode when AD-converting the first signal, and operates in a second AD conversion mode when AD-converting the second signal.

9 Claims, 12 Drawing Sheets

F I G. 2
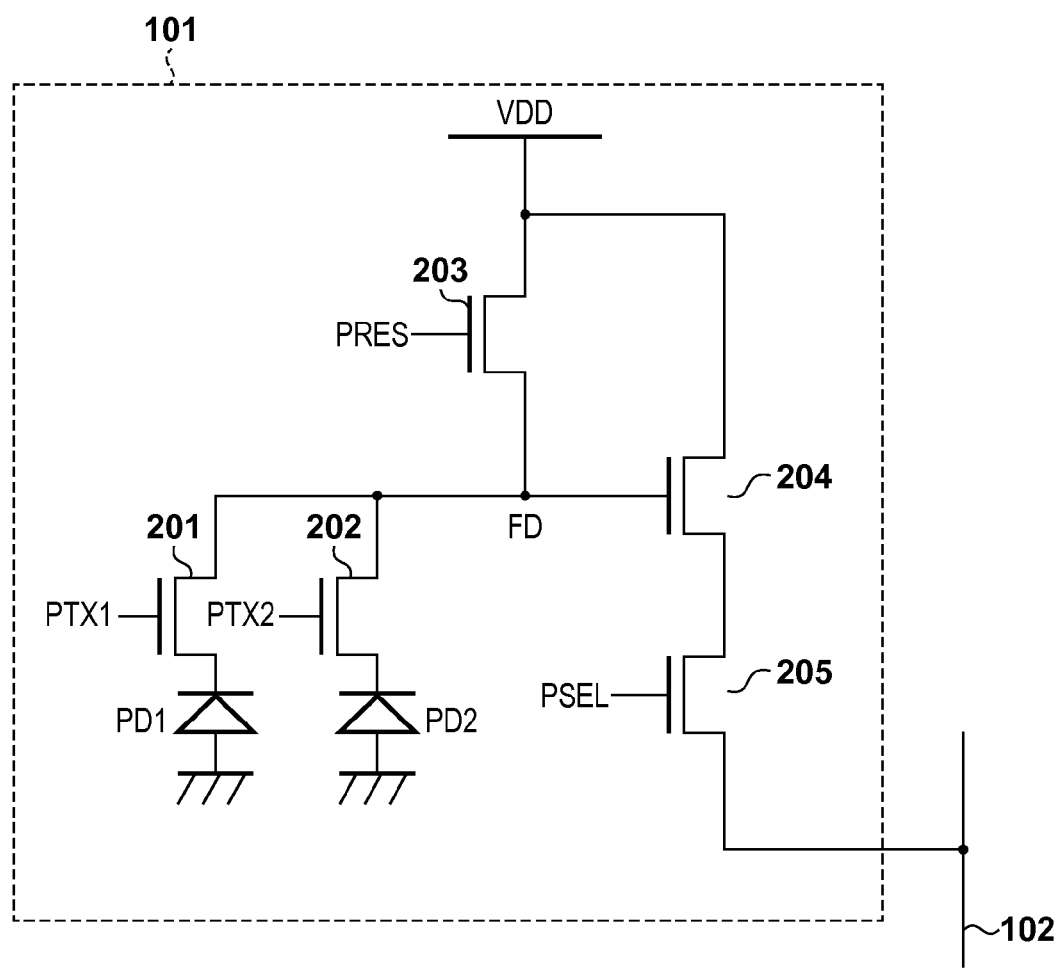

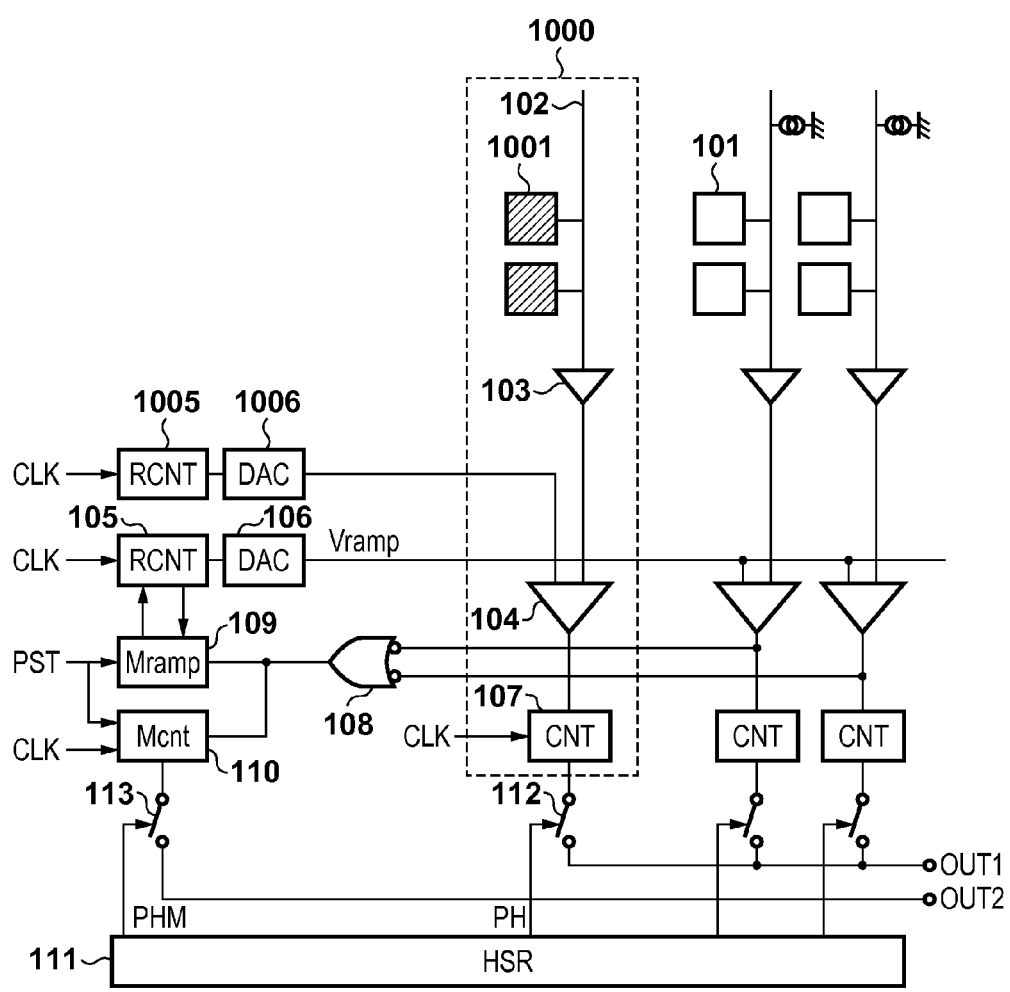
F I G. 10

SOLID-STATE IMAGE SENSOR, METHOD OF CONTROLLING THE SAME, AND STORAGE MEDIUM

BACKGROUND OF THE INVENTION

Field of the Invention

The present invention relates to a solid-state image sensor, a method of controlling the same, and a storage medium.

Description of the Related Art

A solid-state image sensing element conventionally used in an image capturing apparatus such as a digital still camera or a digital video camera is required to attain high-speed driving to improve the frame speed or frame rate. As a method of implementing high-speed driving, the drive current is increased. However, increasing the drive current is not preferable because lower power consumption is simultaneously required in consideration of the influence of heat on image quality in these days.

Japanese Patent Laid-Open No. 2004-134867 discloses a technique of reading out a first pixel signal and then adding and reading out a second pixel signal without reset in an arrangement in which two photodiodes (PDs) in proximity share one amplification MOS. The second pixel signal is obtained by subtracting the first pixel signal from the sum signal. According to Japanese Patent Laid-Open No. 2004-134867, since a common reset level signal can be used for the first pixel and the second pixel, the count of reset level signal readout can be reduced by one. The driving method described in Japanese Patent Laid-Open No. 2004-134867 is a very effective means to the above-described problem because the readout time can be shortened without increasing the drive current.

On the other hand, solid-state image sensing elements using a column parallel AD conversion method have become widespread. The solid-state image sensing element using the column parallel AD conversion method can perform AD conversion in it and can therefore perform high-speed signal output.

As one of the column parallel AD conversion methods, a method called a single slope method is widely known. In the single slope method, an electric potential corresponding to a pixel signal is input to one input of a comparator, and a ramp waveform whose electric potential varies with a certain slope as the time elapses is input to the other input as a reference signal. A counter counts a time from the start of comparison up to inversion of the comparator. The count value is output as a digital signal.

In this single slope AD conversion, the counter is one of main power-consuming components because it continues operating from the start of comparison up to inversion of the comparator.

Japanese Patent Laid-Open No. 2010-56707 discloses the following technique. That is, the signal value of a readout row is predicted from the signal value of the same row of a preceding frame or a preceding row of the same frame, which has undergone AD conversion at a preceding timing. The start potential of the reference signal is changed to an electric potential close to the analog pixel signal potential, thereby shortening the operation period of the counter.

Examine driving that combines the technique described in Japanese Patent Laid-Open No. 2004-134867, which can read out a pixel signal at a high speed, and the column parallel AD conversion method capable of high-speed output for faster readout driving. At this time, when AD-converting the sum signal of a first pixel and a second pixel, the signal including the first pixel signal that has already undergone AD conversion is AD-converted again. This leads to a wasteful counter operation and is still problematic from the viewpoint of power consumption.

In the technique of Japanese Patent Laid-Open No. 2010-56707, for example, when predicting the signal value of a readout row from the signal value of the same row of a preceding frame, the signal value of the readout row is predicted from the signal value of pixels that are different in terms of time. For this reason, in case of a high-speed object or the like, the signal value changes at high possibility between the readout row and the same row of the preceding frame. The operation period of the counter may be prolonged because correct prediction is impossible. When predicting the signal value of a readout row from the signal value of a preceding row of the same frame, the signal of the readout row is predicted from pixels that are different in terms of space. Hence, for an object whose luminance changes in the vertical direction, correct prediction may be impossible due to the same reason.

SUMMARY OF THE INVENTION

The present invention has been made in consideration of the above-described problems, and provides an image sensing element using a column parallel AD conversion method, which can attain high-speed driving and low power consumption.

According the first aspect of the present invention, there is provided a solid-state image sensor comprising: a pixel portion in which unit pixels are arranged in matrix, each unit pixel including a plurality of photodiodes, transfer switches respectively provided for the plurality of photodiodes, a floating diffusion portion commonly connected via the transfer switches, and reset means for resetting the floating diffusion portion and an AD converter configured to convert an analog signal from the floating diffusion portion into a digital signal and read out the digital signal, wherein the AD converter includes a reference signal generator configured to generate a reference signal whose electric potential varies with a predetermined slope as a time elapses, and a comparator configured to compare the reference signal and the analog signal and vary an output depending on a magnitude relationship, the floating diffusion portion accumulates a first signal obtained by transferring a signal of at least one of the plurality of photodiodes of the pixel portion via the transfer switch, and adds, to the first signal, a second signal obtained by transferring a signal of at least one of the plurality of photodiodes via the transfer switch in a state in which the first signal is not reset and accumulates the second signal, and the AD converter operates in a first AD conversion mode when AD-converting the first signal, and operates in a second AD conversion mode different from the first AD conversion mode when AD-converting the second signal.

According to the second aspect of the present invention, there is provided a solid-state image sensor comprising: a plurality of pixels each of which includes a plurality of photoelectric conversion portions, a charge/voltage conversion portion shared by the plurality of photoelectric conversion portions, and a plurality of transfer portions configured to transfer charges generated by the plurality of photoelectric conversion portions to the charge/voltage conversion portion, and is configured to output a first signal output by transferring first charges generated by at least one of the photoelectric conversion portions to the charge/voltage conversion portion and output a second signal by transferring second charges generated by at least one of the remaining photoelectric conversion portions to the charge/voltage conversion portion and adding the second charges to the first charges and an AD converter configured to convert an analog signal output from each of the plurality of pixels into a digital signal, wherein AD conversion of the second signal is controlled in accordance with an AD conversion result of the first signal by the AD converter.

According to the third aspect of the present invention, there is provided a method of controlling a solid-state image sensor including a pixel portion in which unit pixels are arranged in matrix, each unit pixel including a plurality of photodiodes, transfer switches respectively provided for the plurality of photodiodes, a floating diffusion portion commonly connected via the transfer switches, and reset means for resetting the floating diffusion portion, and an AD converter configured to convert an analog signal from the floating diffusion portion into a digital signal and read out the digital signal, the method comprising: a comparison step of causing the AD converter to generate a reference signal whose electric potential varies with a predetermined slope as a time elapses, compare the reference signal and the analog signal, and vary an output depending on a magnitude relationship; an accumulation step of causing the floating diffusion portion to accumulate a first signal obtained by transferring a signal of at least one of the plurality of photodiodes of the pixel portion via the transfer switch, and add, to the first signal, a second signal obtained by transferring a signal of at least one of the plurality of photodiodes via the transfer switch in a state in which the first signal is not reset and accumulate the second signal, and an operation step of causing the AD converter to operate in a first AD conversion mode when AD-converting the first signal, and operate in a second AD conversion mode different from the first AD conversion mode when AD-converting the second signal.

According to the fourth aspect of the present invention, there is provided a method of controlling a solid-state image sensor including a plurality of pixels each of which includes a plurality of photoelectric conversion portions, a charge/voltage conversion portion shared by the plurality of photoelectric conversion portions, and a plurality of transfer portions configured to transfer charges generated by the plurality of photoelectric conversion portions to the charge/voltage conversion portion, and is configured to output a first signal output by transferring first charges generated by at least one of the photoelectric conversion portions to the charge/voltage conversion portion and output a second signal by transferring second charges generated by at least one of the remaining photoelectric conversion portions to the charge/voltage conversion portion and adding the second charges to the first charges, and an AD converter configured to convert an analog signal output from each of the plurality of pixels into a digital signal, the method comprising: control step of controlling AD conversion of the second signal in accordance with an AD conversion result of the first signal by the AD converter.

Further features of the present invention will become apparent from the following description of exemplary embodiments with reference to the attached drawings.

BRIEF DESCRIPTION OF THE DRAWINGS

FIG. 2 is an equivalent circuit diagram of a unit pixel according to the first embodiment;

FIG. 10 is a block diagram of the arrangement of a solid-state image sensing element according to the third embodiment;

DESCRIPTION OF THE EMBODIMENTS

The embodiments of the present invention will now be described in detail with reference to the accompanying drawings.

First Embodiment

1. Arrangement of Solid-State Image Sensing Element

Figure 1:
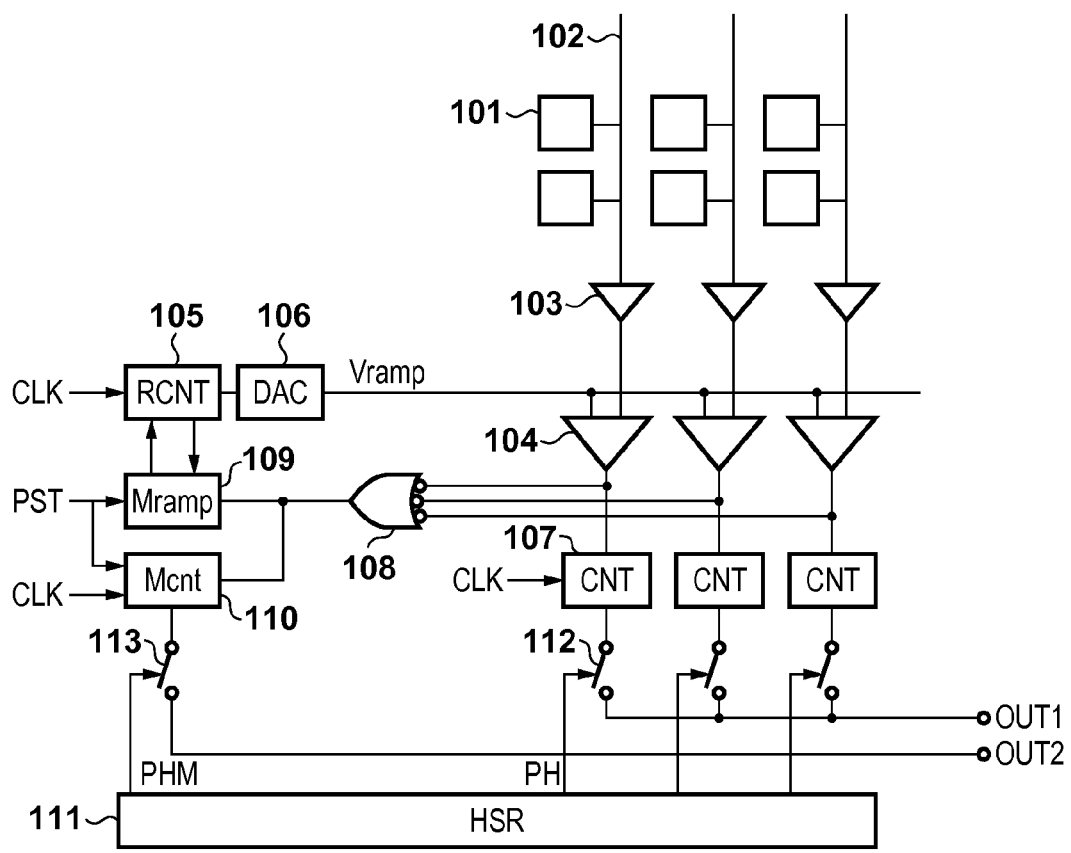
FIG. 1 is a block diagram of the first arrangement of a solid-state image sensing element according to the first embodiment.

The arrangement of a solid-state image sensing element according to the first embodiment of the present invention will be described. FIG. 1 is a block diagram showing the arrangement of the solid-state image sensing element according to the first embodiment. As shown in FIG. 1, a plurality of unit pixels 101 are arranged in matrix to form a pixel portion. The arrangement of the unit pixel will be described later.

An electric potential according to the signal of a unit pixel is output to a vertical signal line 102. From the viewpoint of noise reduction, an amplifier 103 that amplifies the signal of a pixel is preferably a gain amplifier that multiplies a gain. However, the amplifier is not always necessary and may be absent. A comparator 104 compares signals. A counter (RCNT) 105 performs the count operation. A digital/analog converter (DAC) 106 converts a digital signal into an analog signal. The n-bit counter (RCNT) 105 receives a reference clock CLK and performs the down-count operation based on the reference clock CLK. The count value of the RCNT 105 is denoted by Cramp. The DAC 106 receives the count value Cramp, converts it into an analog signal, and then outputs an analog ramp signal Vramp according to the count value Cramp via a low-pass filter (not shown). The analog ramp signal Vramp generated by the DAC 106 (reference signal generator) is input to one terminal of the comparator 104 arranged in each column as the reference signal of a pixel signal.

The vertical signal line 102 is connected to the other terminal of the comparator 104 via the amplifier 103, and a pixel signal is input. The comparator 104 compares the pixel signal with the ramp signal Vramp, and outputs an inverted signal at a timing at which the pixel signal and the ramp signal Vramp match. An n-bit counter (CNT) 107 performs the up-count operation with time based on the reference clock CLK, like the RCNT 105. The CNT 107 is configured to start the count operation at a timing at which the comparator 104 starts comparing the pixel signal and the ramp signal Vramp, and when the comparator output is inverted, hold the count value at that timing.

The output of the comparator 104 of each column is connected to a NOR circuit 108. That is, when the output of at least one of the comparators of the columns is inverted, and Low level is input, the output of the NOR circuit 108 changes to Hi. A digital memory (Mramp) 109 is connected to the RCNT 105 and the output terminal of the NOR circuit 108. A pulse PST for controlling the memory operation is input to the Mramp 109. The Mramp 109 performs the following operation in accordance with the pulse PST and the output of the NOR circuit 108.

Using the positive edge of the NOR circuit 108 as a trigger, the Mramp 109 holds the count value Cramp at that timing in the Hi period of the pulse PST. In addition, the Mramp 109 sets the held value in the RCNT 105 as the initial value of the counter using the negative edge of the pulse PST as a trigger.

An n-bit counter (Mcnt) 110 is connected to the output terminal of the NOR circuit 108. The Mcnt 110 can perform an up-counter operation, like the CNT 107, and receives the same clock as the reference clock input to the RCNT 105 and the CNT 107. The Mcnt 110 performs the following operation in accordance with the pulse PST, the reference clock CLK, and the output of the NOR circuit 108.

In the Hi period of the pulse PST, the Mcnt 110 starts the count operation at a timing at which the comparison between the pixel signal and the ramp signal Vramp starts, like the CNT 107, and using the positive edge of the NOR circuit 108 as a trigger, holds the count value at that timing.

A horizontal transfer circuit (HSR) 111 controls horizontal transfer switches 112 by a horizontal transfer pulse PH, thereby sequentially outputting digital values held by the CNTs 107 to an output terminal OUT1. The HSR 111 also controls a memory transfer switch 113 by a memory transfer pulse PHM, thereby outputting the count value held by the Mcnt 110 to an output terminal OUT2. The count value output from the output terminal OUT2 at this time is denoted by M.

The arrangement of the solid-state image sensing element according to the first embodiment has been described above.

2. Arrangement of Unit Pixel

The arrangement of the unit pixel will be described next. FIG. 2 is an equivalent circuit diagram of the unit pixel. The unit pixel is formed from two PDs, five MOS transistors, and one floating diffusion portion (FD). PD1 and PD2 are photoelectric conversion elements and are connected, via transfer switches 201 and 202 respectively, to the FD serving as a memory for temporarily accumulating charges. The transfer switches 201 and 202 are controlled by transfer pulses PTX1 and PTX2 and transfer the charges generated by the PD1 or PD2 to the FD to convert them into a voltage. The FD is connected to the gate of an amplification MOS 204. The amplification MOS 204 is connected to the vertical signal line 102, and forms a source follower amplifier together with a constant current source (not shown). A reset switch 203 is controlled by a reset pulse PRES and resets the FD to a power supply voltage VDD. The amplification MOS 204 outputs a voltage according to the voltage of the FD to the vertical signal line 102 via a select switch 205. The select switch 205 is used to select a row to be read out and controlled by a select pulse PSEL.

The signal at the time of reset will be referred to as a reset signal, a pixel signal by the PD1 as a first pixel signal, and a pixel signal by the PD2 as a second pixel signal herein.

The arrangement of the unit pixel of the solid-state image sensing element according to the first embodiment has been described above.

3. Pixel Signal Readout Driving

A driving method when reading out the first pixel signal and then adding and reading out the second pixel signal without reset in the solid-state image sensing element that can perform column parallel AD conversion and has the above-described unit pixel arrangement in which two PDs in proximity share one amplification MOS will be described next.

Figure 3:
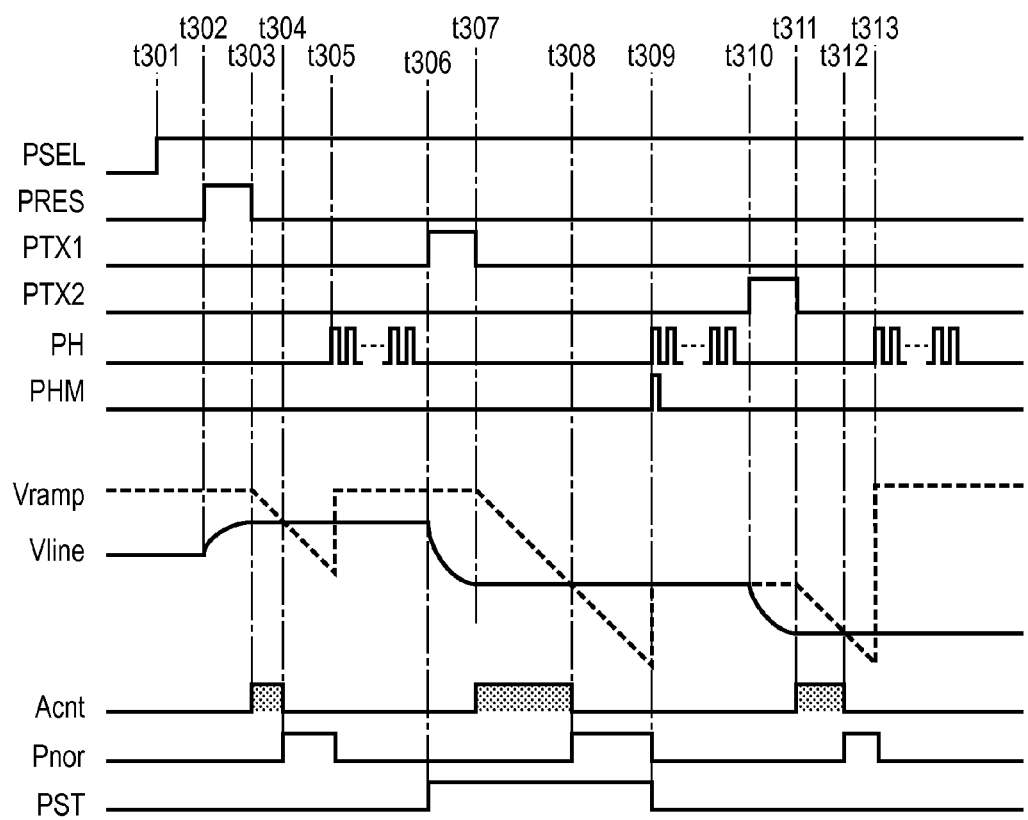
FIG. 3 is a timing chart of the readout operation of the first arrangement according to the first embodiment.

FIG. 3 is a timing chart of the readout operation after exposure. The timing chart of FIG. 3 shows driving of a column whose comparator has output an inverted signal earliest in the selected row when an AD converter AD-converts the first pixel signal.

Vline and Pnor in the timing chart indicate the vertical signal line potential and the output pulse of the NOR circuit 108, respectively. Acnt indicates driving of the CNT 107 and represents that the count operation is performed during the Hi period.

3-1. Reset Signal Readout

When the exposure period ends, at time t301, the select pulse PSEL of an arbitrary selected row changes to Hi, and the signal of the arbitrary row is transmitted to the vertical signal line of each column. AD conversion of the reset signal is performed during a period from time t302 to t305. In the period from the time t302 to t303, the reset pulse PRES changes to Hi to reset the FD, and the vertical signal line potential Vline changes to an electric potential according to the reset signal.

In the period from the time t303 to t305, the DAC 106 outputs the ramp signal Vramp, and AD conversion is performed. As indicated by Acnt, the CNT 107 performs the count operation during the period from the time t303 of the start of comparison to the time t304 at which the vertical signal line potential Vline matches the ramp signal Vramp.

When reaching a predetermined electric potential at the time t305, the ramp signal Vramp is reset to the initial value. In addition, output of the count value held by the CNT 107 of each column to the output terminal OUT1 is started by the horizontal transfer pulse PH output from the HSR 111.

3-2. Pixel Signal Readout 1

In the period from time t306 to t309, the pulse PST changes to Hi. In the period from time t306 to t307, the transfer pulse PTX1 changes to Hi, and the charges in the PD1 are transferred so as to be added to the FD that holds the reset signal potential. The vertical signal line potential Vline becomes an electric potential corresponding to the sum signal of the reset signal and the first pixel signal. Here, the sum signal of the reset signal and the first pixel signal is defined as a first sum signal.

In the period from the time t307 to t309, the DAC 106 outputs the ramp signal Vramp to perform AD conversion (first AD conversion mode) of the first sum signal. The CNT 107 and the Mcnt 110 perform the count operation during the period from the time t307 to the time t308 at which the vertical signal line potential Vline and the ramp signal Vramp match. The comparator outputs an inverted signal at the time t308 at which the vertical signal line potential Vline and the ramp signal Vramp match. The NOR circuit output Pnor thus rises. Upon detecting the edge, the Mramp 109 holds Cramp at the time t308, and the Mcnt 110 holds the count value at the time t308.

When the pulse PST falls at the same time as the ramp signal Vramp reaches a predetermined electric potential at the time t309, the value held by the Mramp 109 becomes the initial value of the RCNT 105, and the ramp signal Vramp obtains an electric potential corresponding to the initial value of the RCNT 105. In addition, output of the count value held by the CNT 107 of each column to the output terminal OUT1 is started by the horizontal transfer pulse PH output from the HSR 111, and the value held by the Mcnt 110 is output to the output terminal OUT2 by the memory transfer pulse PHM.

3-3. Pixel Signal Readout 2

In the period from time t310 to t311, the transfer pulse PTX2 changes to Hi, and the charges of the second pixel signal are transferred so as to be added to the first sum signal without resetting the FD that holds the first sum signal. The vertical signal line potential Vline becomes an electric potential corresponding to the sum signal of the first sum signal and the second pixel signal. Here, the sum signal of the first sum signal and the second pixel signal is defined as a second sum signal.

In the period from the time t311 to t313, the DAC 106 outputs a ramp waveform based on the ramp signal Vramp set at the time t308 to perform AD conversion (second AD conversion mode) of the second sum signal. At this time, since the start potential of the ramp signal Vramp is the electric potential corresponding to the first sum signal, the difference between the start potential of the ramp signal Vramp and the vertical signal line potential Vline corresponds to the second pixel signal. The CNT 107 operates by an amount corresponding to the second pixel signal that is the difference.

The CNT 107 performs the count operation during the period from the time t311 to the time t312 at which the vertical signal line potential Vline and the ramp signal Vramp match. Upon reaching a predetermined electric potential at the time t313, the ramp signal Vramp is reset to the initial value. In addition, output of the count value held by the CNT 107 of each column to the output terminal OUT1 is started by the horizontal transfer pulse PH output from the HSR 111. When the output ends, the readout of the selected row ends.

Pixel signal readout driving according to the first embodiment has been described above.

4. Output Correction Operation

An operation method of calculating the first pixel signal and the second pixel signal of each pixel from a digital value obtained by the above-described driving will be described next. Before the description of the operation method, an example in which the above-described image sensing element driving method is applied to an image capturing apparatus will be explained in detail with reference to FIG. 4.

Figure 4:
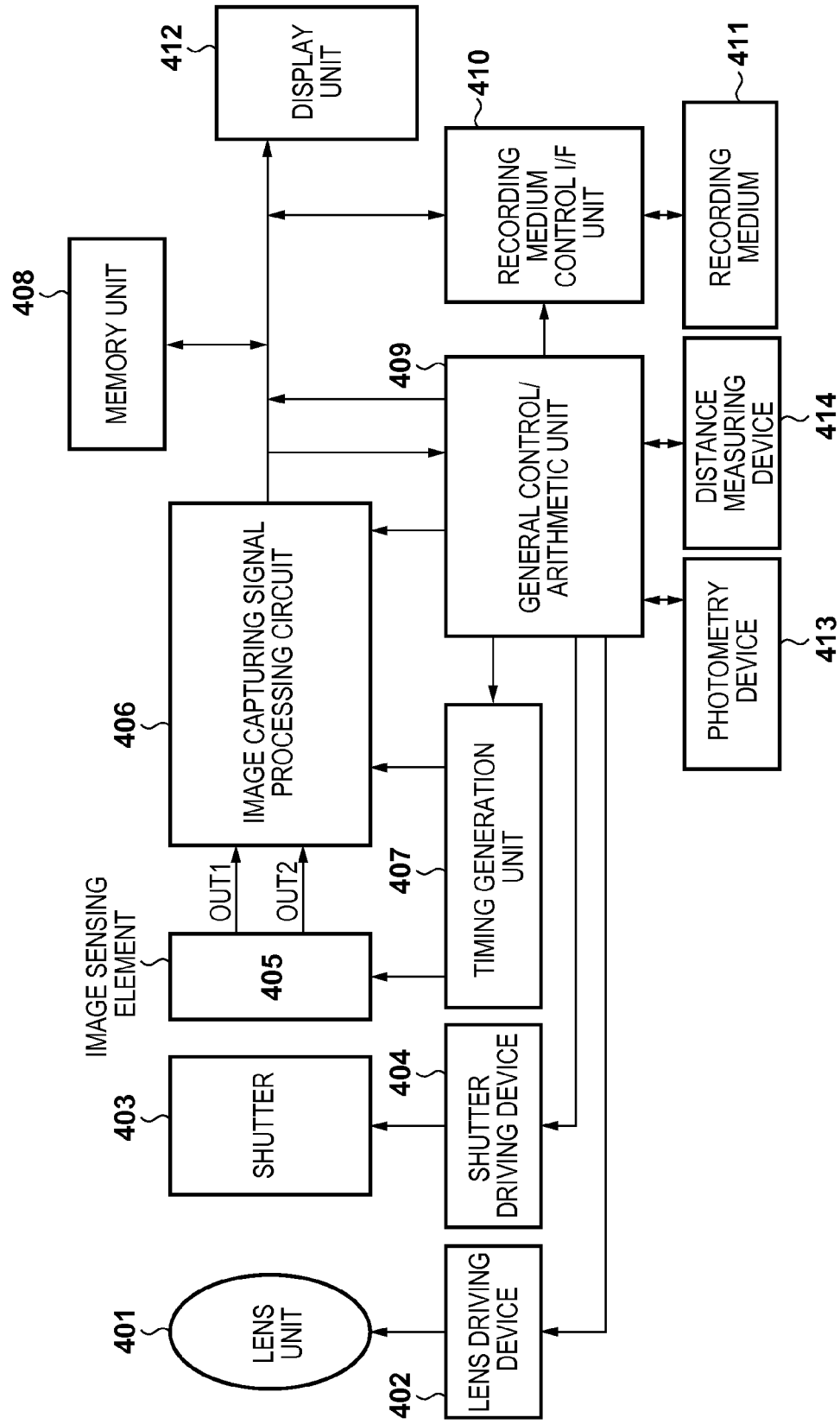
FIG. 4 is a block diagram of an image capturing apparatus according to the first embodiment.

Referring to FIG. 4, a lens unit 401 forms an optical image of an object on an image sensing element 405. A lens driving device 402 controls zooming, focusing, stop, and the like. A mechanical shutter 403 is controlled by a shutter driving device 404. The image sensing element 405 receives the object image formed by the lens unit 401 as an image signal. An image capturing signal processing circuit 406 performs various kinds of correction or data compression for the image signal output from the image sensing element 405. The output terminals OUT1 and OUT2 of the image sensing element are connected to the image capturing signal processing circuit. A timing generation unit 407 outputs various timing signals to the image sensing element 405 and the image capturing signal processing circuit 406. A general control/arithmetic unit 409 controls various operations and the entire image capturing apparatus. A memory unit 408 temporarily stores image data. A recording medium control I/F unit 410 is an interface that performs recording or readout for a recording medium 411. The recording medium 411 is a detachable recording medium such as a semiconductor memory used for image data recording or readout. A display unit 412 displays various kinds of information and a shot image. A photometry device 413 detects the brightness of the object. A distance measuring device 414 detects the object distance.

The operation of a digital camera having the above-described arrangement in shooting will be described next.

When the main power is turned on, the control system is powered on, and the imaging system circuits including the image capturing signal processing circuit 406 are also powered on. When a release button (not shown) is pressed, based on a signal output from the distance measuring device 414, the general control/arithmetic unit 409 extracts high-frequency components and performs an operation of the distance up to the object. After that, the lens driving device 402 drives the lens unit 401 and determines whether an in-focus state is obtained. Upon determining that no in-focus state is obtained, the lens driving device 402 drives the lens unit 401 again, and the distance is measured.

After confirming the in-focus state, a shooting operation starts. When the shooting operation ends, the image signal output from the image sensing element 405 undergoes a correction operation and image processing (to be described later) in the image capturing signal processing circuit 406 and written in the memory unit 408 by the general control/arithmetic unit 409. The data accumulated in the memory unit 408 is recorded in the detachable recording medium 411 which may be a semiconductor memory via the recording medium control I/F unit 410 under the control of the general control/arithmetic unit 409.

An image may be input to the computer or the like directly via an external I/F unit (not shown) and processed.

A correction operation in the image capturing signal processing circuit 406 of the above-described image capturing apparatus will be described. A reset signal N after AD conversion, the first sum signal of the reset signal N and a first pixel signal Sa, and the second sum signal that is the sum signal of the first sum signal and a second pixel signal Sb are input to the image capturing signal processing circuit 406 via the output terminal OUT1 of the image sensing element 405. In addition, the count value M when AD-converting the first sum signal held by the Mcnt 110 is input via the output terminal OUT2 of the image sensing element 405.

In the selected row, the reset signal N, the first pixel signal Sa, and the second pixel signal Sb have values corresponding to each column, and the count value M output from the output terminal OUT2 is common to all columns.

When AD-converting the second sum signal obtained by adding the first sum signal and the second pixel signal, the count operation starts from the count value M when the first sum signal obtained by adding the reset signal and the first pixel signal has been AD-converted, as described above. For this reason, the second sum signal after the AD conversion is represented by N+Sa+Sb−M.

Hence, the image capturing signal processing circuit 406 obtains the first pixel signal Sa by subtracting the reset signal N from the first sum signal N+Sa. In addition, the image capturing signal processing circuit 406 obtains the second pixel signal Sb by adding the count value M upon AD conversion of the first sum signal to the second sum signal N+Sa+Sb−M and subtracting the first sum signal N+Sa.

The output correction operation method according to the first embodiment has been described above.

According to this embodiment, when AD-converting the second sum signal, the initial value of the RCNT 105 is a value corresponding to the first sum signal. Hence, the difference between the start potential of the ramp signal Vramp and the second sum signal corresponds to the second pixel signal. Since the CNT 107 operates by an amount corresponding to the second pixel signal that is the difference, the count operation corresponding to the first sum signal that has already undergone AD conversion can be omitted, and power consumption can be reduced. Additionally, since the start potential of the ramp signal Vramp when AD-converting the second sum signal is predicted from the first sum signal included in the second sum signal, no prediction error depending on the object occurs, and low power consumption driving can accurately be performed.

In the above embodiment, the signals are output to the image capturing signal processing circuit 406, and the image capturing signal processing circuit 406 performs the correction operation, thereby calculating signals used for an image. However, the image sensing element may incorporate memories capable of holding signals on a column basis and a difference circuit, and the correction operation may partially be performed in the image sensing element.

Figure 5:
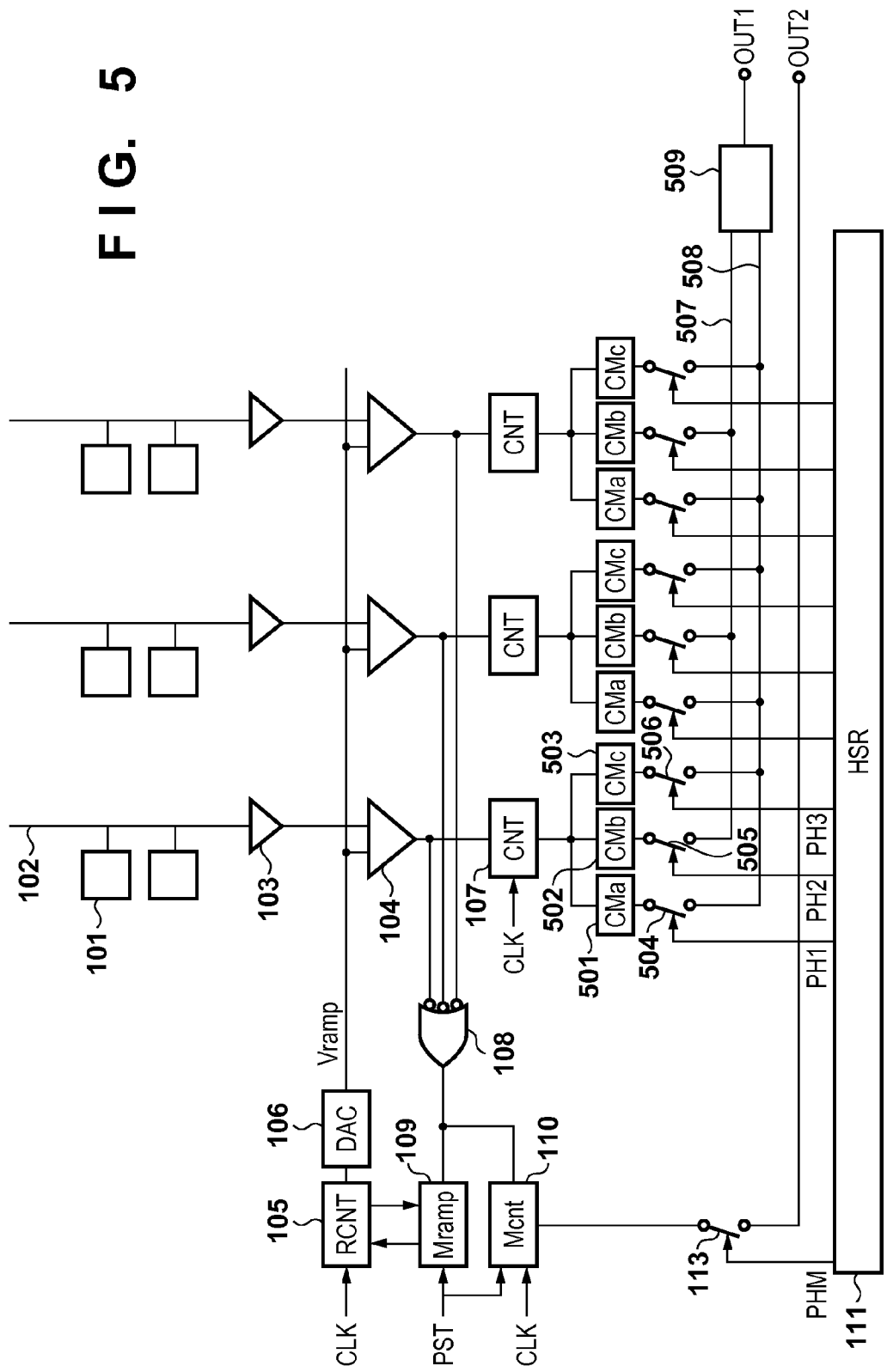
FIG. 5 is a block diagram of the second arrangement of the solid-state image sensing element according to the first embodiment.

A detailed arrangement and timing will be described below. FIG. 5 is a block diagram of an image sensing element that includes memories capable of holding signals on a column basis and a subtracter and partially performs the operation in it.

The image sensing element includes CMa 501, CMb 502, and CMc 503 each serving as a memory and switches 504, 505, and 506 corresponding to them, in addition to the arrangement described with reference to FIG. 1. The CMa 501, the CMb 502, and the CMc 503 hold the count value of the CNT 107 at a timing at which the comparator 104 outputs an inverted signal upon reset signal readout, first sum signal readout, and second sum signal readout, respectively.

The switches 504, 505, and 506 are controlled by horizontal transfer pulses PH1, PH2, and PH3 output from the horizontal transfer circuit HSR. The CMa 501 and the CMc 503 are connected to a horizontal transfer line 508 via the switches 504 and 506, and the CMb 502 is connected to a horizontal transfer line 507 via the switch 505. The horizontal transfer lines 507 and 508 are connected to the input terminals of a difference circuit 509. The difference circuit 509 outputs the difference between the two input signals to the output terminal OUT1. The difference circuit 509 can control whether to output a value obtained by subtracting the signal value of the horizontal transfer line 508 from the signal value of the horizontal transfer line 507 or output a value obtained by subtracting the signal value of the horizontal transfer line 507 from the signal value of the horizontal transfer line 508. More specifically, the value obtained by subtracting the signal value of the horizontal transfer line 508 from the signal value of the horizontal transfer line 507 is output during the period from the positive edge to the transfer pulse PTX1 to the positive edge of the transfer pulse PTX2. In the remaining period, the value obtained by subtracting the signal value of the horizontal transfer line 507 from the signal value of the horizontal transfer line 508 is output.

Figure 6:
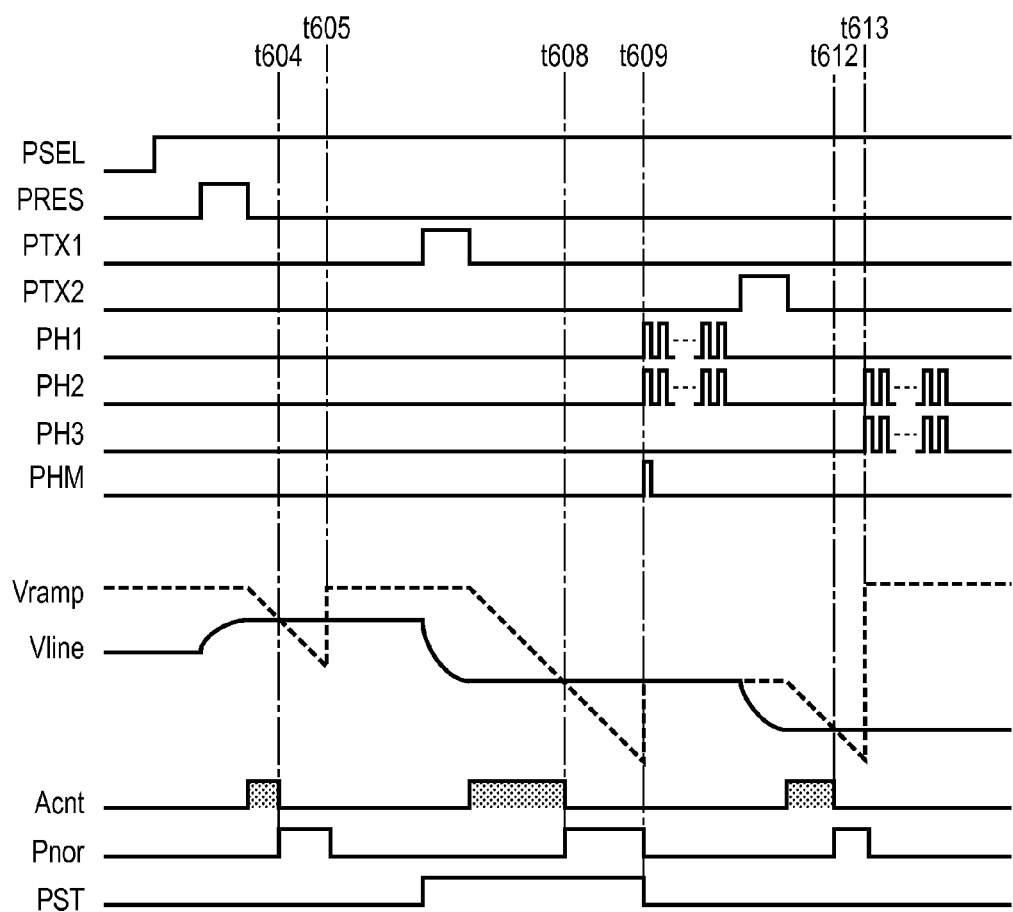
FIG. 6 is a timing chart of the readout operation of the second arrangement according to the first embodiment.

A timing chart when performing the readout operation after exposure by the arrangement of FIG. 5 will be described next with reference to FIG. 6. Like FIG. 3, the timing chart of FIG. 6 shows driving of a column whose comparator has output an inverted signal earliest in the selected row when the first pixel signal is AD-converted. A description of portions where the same driving as in FIG. 3 is performed will be omitted.

When the vertical signal line potential Vline and the ramp signal Vramp match at time t604 of the reset signal readout period, the comparator outputs an inverted signal, and the count value by the CNT 107 at that time is held by the CMa 501. In the above embodiment, horizontal transfer is performed at time corresponding to time t605. Here, however, the horizontal transfer is not performed.

Next, when the vertical signal line potential Vline and the ramp signal Vramp match at time t608 of the first sum signal readout period, the comparator outputs an inverted signal, and the count value by the CNT 107 at that time is held by the CMb 502. The reset signal value held by the CMa 501 and the first sum signal value held by the CMb 502 of each column are input to the difference circuit 509 by the horizontal transfer pulses PH1 and PH2 output from the HSR 111 at time t609. A value obtained by subtracting the reset signal value held by the CMa 501 from the first sum signal value held by the CMb 502 is output to the image capturing signal processing circuit. Since the difference signal output here is the first pixel signal Sa obtained by subtracting the reset signal N from the first sum signal N+Sa, the operation by the image capturing signal processing circuit is not necessary.

Next, when the vertical signal line potential Vline and the ramp signal Vramp match at time t612 of the second pixel signal readout period, the comparator outputs an inverted signal, and the count value by the CNT 107 at that time is held by the CMc 503. The first sum signal value held by the CMb 502 and the second sum signal value held by the CMc 503 of each column are input to the difference circuit 509 by the horizontal transfer pulses PH2 and PH3 output from the HSR 111 at time t613. A value obtained by subtracting the first sum signal value held by the CMb 502 from the second sum signal value held by the CMc 503 is output to the image capturing signal processing circuit.

The difference signal output here is a signal Sb−M obtained by subtracting the first sum signal value N+Sa from the second sum signal value N+Sa+Sb−M. For this reason, in the operation by the image capturing signal processing circuit, the second pixel signal Sb is obtained only by adding the count value M upon AD conversion of the first sum signal output from the output terminal OUT2 to the difference signal Sb−M output here. The addition operation of the count value M may be performed internally, and the external operation may be prohibited.

Like the above arrangement and driving, an arrangement including memories capable of holding signals on a column basis and a difference circuit in the image sensing element and capable of simplifying the operation outside the image sensing element may be employed.

In this embodiment, in an arrangement in which two PDs in proximity share one amplification MOS, driving is assumed to be performed by reading out the first sum signal and then adding the second pixel signal to the first sum signal and reading out the second sum signal without reset.

A case where the range of AD conversion is made to correspond to the dynamic range of the FD will be considered. At this time, for example, when the gain amplifier multiplies a gain of 1, as indicated by a of FIG. 7, a range that allows the second pixel signal to be additionally read out remains even when the first sum signal is saturated.

Figure 7:
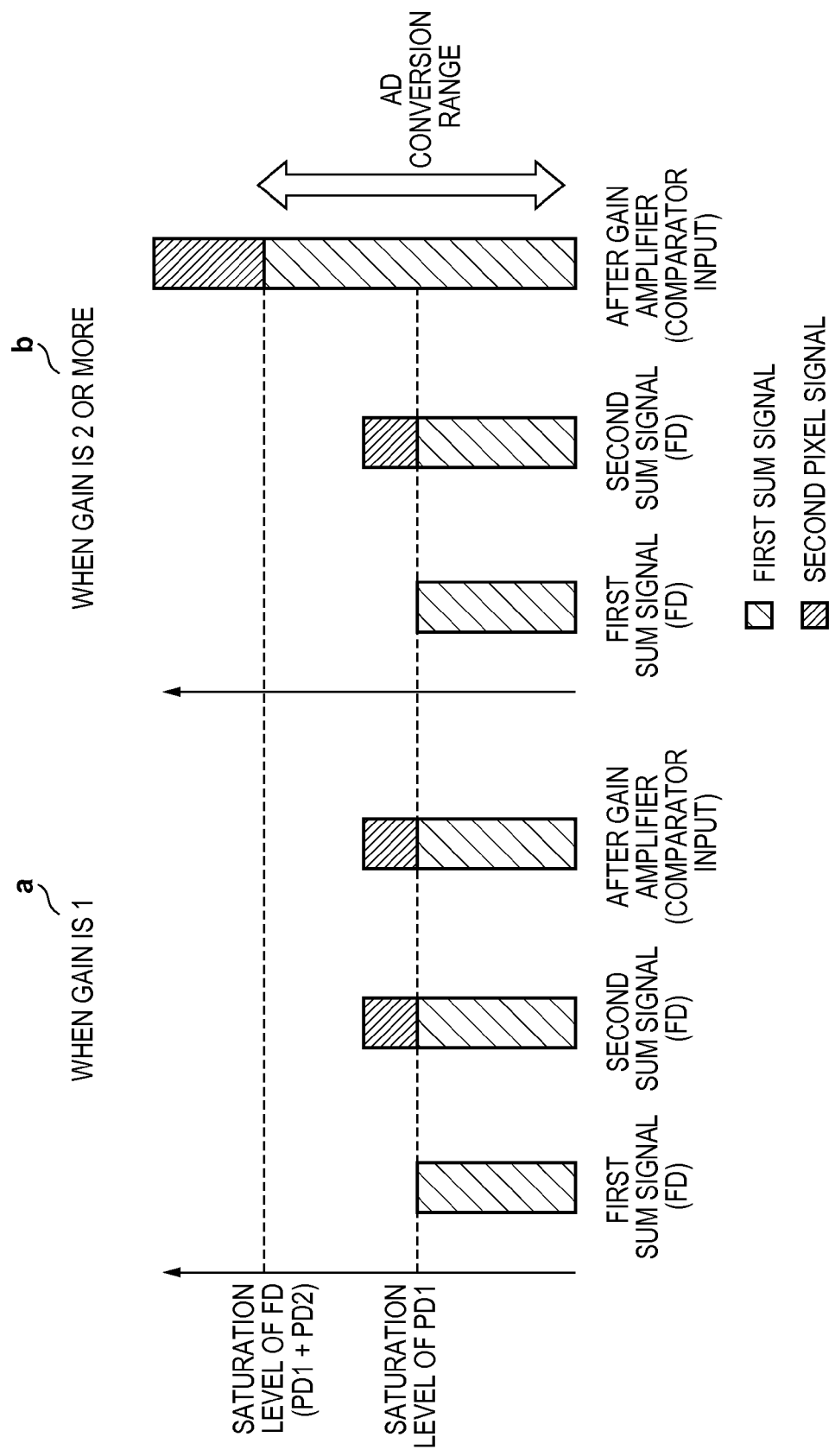
FIG. 7 is a view showing the dynamic range of a first sum signal at the time of saturation according to the first embodiment.

On the other hand, consider a case where the gain amplifier multiplies a gain of 2, as indicated by b of FIG. 7. In this case, if the first sum signal is saturated, the dynamic range of AD conversion is filled with the first sum signal multiplied by the gain of 2. Since the second pixel signal cannot be read out from the second sum signal obtained by adding the second pixel signal to the first sum signal, the second sum signal need not undergo AD conversion.

In this embodiment, in a state in which the gain of 2 is multiplied, and the first sum signal is saturated, the counter does not operate but the comparator or the DAC circuit does when AD-converting the second sum signal. The image capturing signal processing circuit determines whether the first sum signal is saturated. When saturation of the first sum signal is detected, and the gain amplifier multiplies a gain of 2 or more, AD conversion of the second sum signal may be prohibited, and at least one or all of the comparator 104, the RCNT 105, the DAC 106, and the CNT 107 may save power.

Alternatively, not the image capturing signal processing circuit but a first sum signal saturation detection means may be provided in the image sensing element to determine whether the first sum signal is saturated. More specifically, the detection may be done by comparing the analog output of the amplifier 103 and a threshold potential corresponding to saturation of AD conversion or checking whether the count value of the CNT 107 matches a count value corresponding to saturation of AD conversion. If all first sum signals in the selected row are saturated, AD conversion of the second sum signals in the selected row may be prohibited, and at least one or all of the comparator 104, the RCNT 105, the DAC 106, and the CNT 107 may save power. Alternatively, a circuit capable of saving power of the comparator may be provided in each column, and only a comparator corresponding to a pixel whose first sum signal is saturated out of the selected row may save power when AD-converting the second sum signal.

In driving according to this embodiment, assuming that the signal value of the second sum signal is larger than that of the first sum signal, the start potential of the ramp signal Vramp when AD-converting the second sum signal is set to an electric potential corresponding to the first sum signal. However, a case is possible where the second sum signal becomes smaller than the first sum signal due to random noise, and AD conversion cannot appropriately be performed. Considering this problem, when the initial value of the RCNT 105 is set to a value corresponding to the first sum signal when AD-converting the second sum signal, the value may have an offset corresponding to the amount of random noise. Since the random noise also varies in accordance with the analog gain, the offset amount may be changed in accordance with the analog gain.

Second Embodiment

In the first embodiment, when AD-converting the first sum signal, the count value Cramp at the timing at which the comparator output is inverted earliest in the selected row is set to the initial value of AD conversion of the second sum signal, thereby setting the start potential of the Vramp to an electric potential corresponding to the first sum signal. However, the present invention is not limited to deciding the start potential of the ramp signal Vramp on a row basis. The start potential of the ramp signal Vramp may be decided on a pixel basis.

In the second embodiment, an arrangement that decides, on a pixel basis, the start potential of Vramp when AD-converting the second sum signal in accordance with the first sum signal will be described.

1. Arrangement of Solid-State Image Sensing Element

The arrangement of a solid-state image sensing element according to the second embodiment of the present invention will be described.

Figure 8:
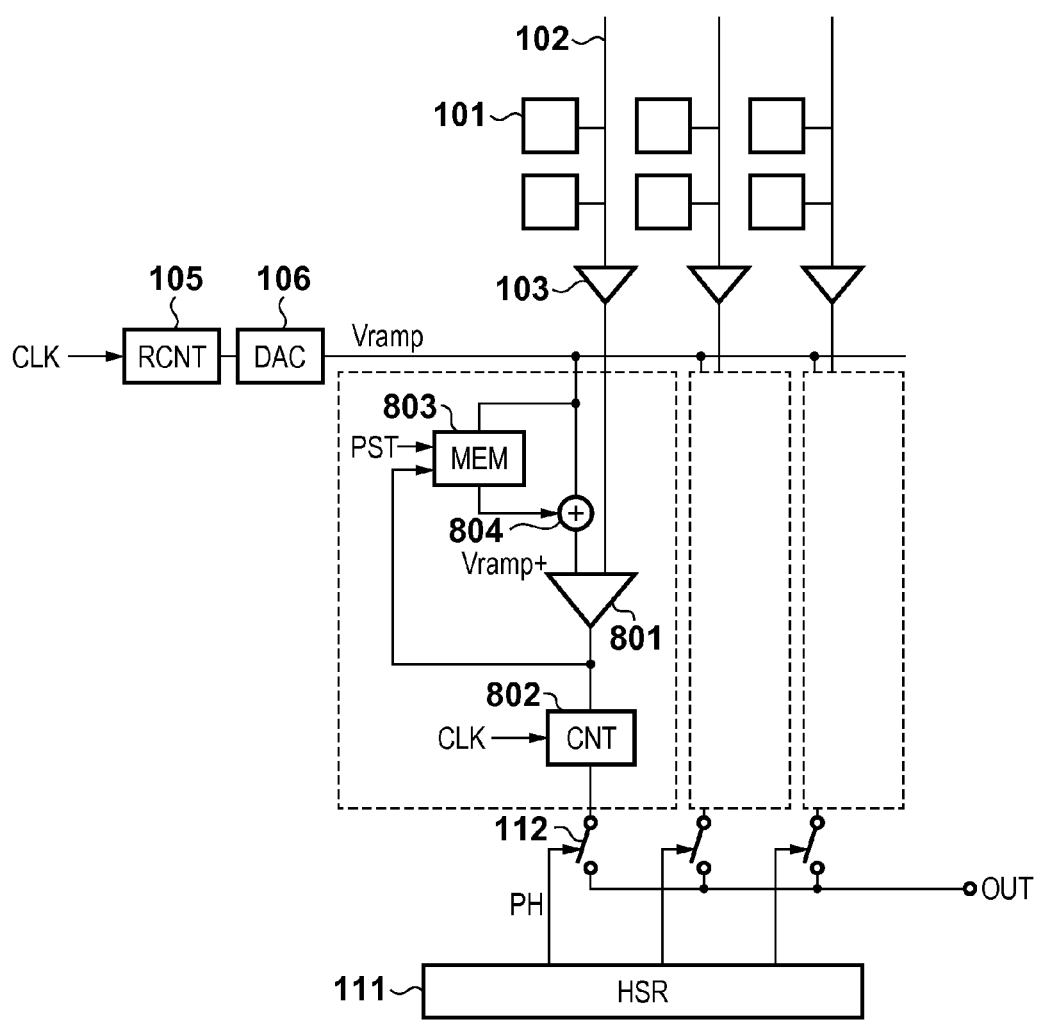
FIG. 8 is a block diagram of the arrangement of a solid-state image sensing element according to the second embodiment.

FIG. 8 is a block diagram showing the arrangement of the solid-state image sensing element according to the second embodiment. A unit pixel 101, a vertical signal line 102, an amplifier 103, an RCNT 105, a DAC 106, an HSR 111, and a horizontal transfer switch 112 are the same as those of the first embodiment shown in FIG. 1, and a description thereof will be omitted. The arrangement of the unit pixel 101 is also the same as that of the first embodiment shown in FIG. 2.

Each block indicated by dotted lines is a column circuit and is arranged for each column. The column circuit includes a comparator 801, a counter (CNT) 802, a memory (MEM) 803, and an adder 804. The vertical signal line 102 is connected to one input terminal of the comparator 801 via the amplifier 103. A ramp signal Vramp+ as the output Vramp of the DAC 106 which has passed through the adder 804 is input to the other input terminal. The comparator 801 compares a vertical signal line potential Vline and the ramp signal Vramp+ and outputs an inverted signal at a timing at which the vertical signal line potential Vline and the ramp signal Vramp+ match. The output from the comparator 801 is input to the CNT 802. The CNT 802 performs the up-count operation with time based on a reference clock CLK. The CNT 802 is configured to start the count operation at a timing at which the comparator 801 starts comparing the vertical signal line potential Vline and the ramp signal Vramp+, and when the comparator output is inverted, hold the count value at that timing.

The MEM 803 is connected to the ramp signal Vramp after branching to each column and receives the output from the comparator 801 and a pulse PST for controlling the memory operation. The MEM 803 holds Vramp at a timing controlled by the pulse PST and the output from the comparator 801. The held electric potential is input to the adder 804 at a timing controlled by the pulse PST. More specifically, when the pulse PST is Hi, and the negative edge of the output from the comparator 801 is detected, the MEM 803 holds the ramp signal Vramp. Upon detecting the negative edge of the pulse PST, the held electric potential is input to the adder 804. The MEM 803 is configured to initialize the held electric potential at a timing at which readout of a selected row starts.

The ramp signal Vramp after branching to each column is also input to the adder 804. The adder 804 is configured to be able to generate the ramp signal Vramp+ whose electric potential has an offset corresponding to the electric potential held by the MEM 803 with respect to the ramp signal Vramp output from the DAC 106.

The arrangement of the solid-state image sensing element according to the second embodiment has been described above.

2. Pixel Signal Readout Driving

Figure 9:
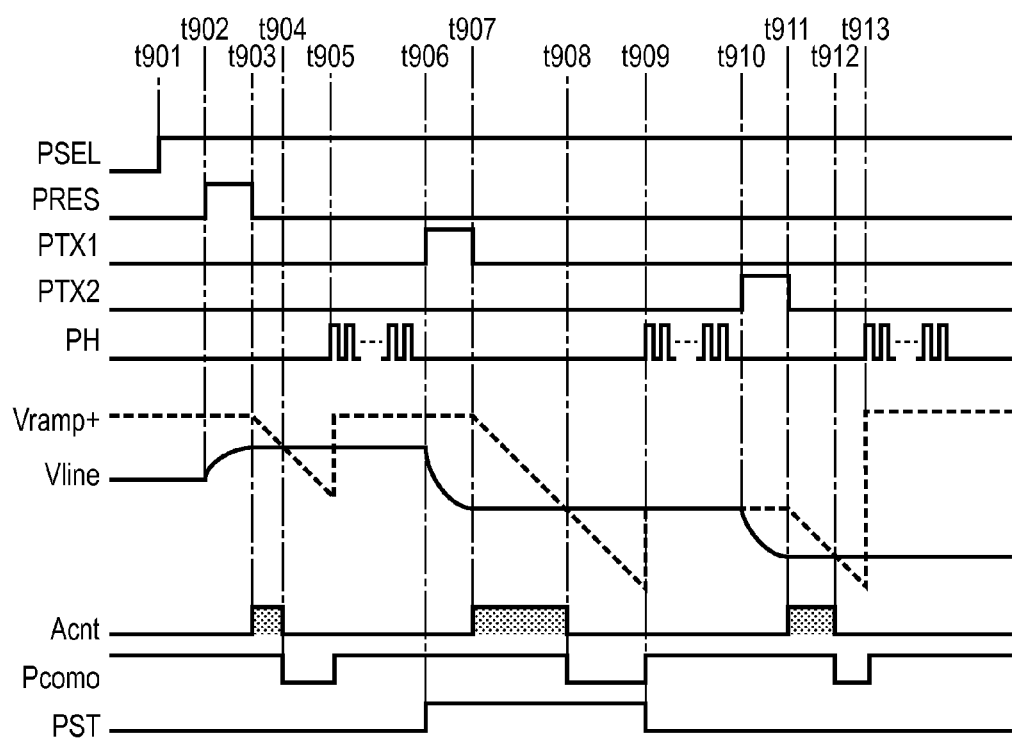
FIG. 9 is a timing chart of a readout operation according to the second embodiment.

An operation when reading out a first sum signal and then adding and reading out a second pixel signal without reset in the solid-state image sensing element according to the second embodiment which can perform column parallel AD conversion and has the unit pixel arrangement in which two PDs in proximity share one amplification MOS will be described next. FIG. 9 is a timing chart of the readout operation after exposure. Pcomp in the timing chart represents the output from the comparator 801.

2-1. Reset Signal Readout

At time t901 at which readout of the selected row starts, the electric potential held by the MEM 803 is initialized. The rest of the operation performed from the time t901 to t906 where the reset signal is read out is the same as that from the time t301 to t306 described in the first embodiment, and a description thereof will be omitted here.

2-2. Pixel Signal Readout 1

In the period from the time t906 to t909, AD conversion of the first sum signal is performed. During this period, the pulse PST changes to Hi. In the period from the time t906 to t907, a transfer pulse PTX1 changes to Hi, and the charges in a PD1 are transferred so as to be added to the FD that holds the reset signal potential. The vertical signal line potential Vline becomes an electric potential corresponding to the first sum signal.

In the period from the time t907 to t909, the DAC 106 outputs the ramp signal Vramp, and the ramp signal Vramp+ as an electric potential that has passed through the adder 804 is input to the comparator 801 perform AD conversion of the first sum signal. At this time, since the MEM 803 is initialized at the time t901, the ramp signal Vramp and the ramp signal Vramp+ have the same electric potential. The CNT 802 performs the count operation during the period from the time t907 to the time t908 at which the vertical signal line potential Vline and the ramp signal Vramp+ match. The output Pcomp of the comparator 801 changes to Low at the time t908 at which the vertical signal line potential Vline and the ramp signal Vramp+ match, and the MEM 803 holds the ramp signal Vramp at the time t908.

The pulse PST falls at the same time as generation of the ramp signal Vramp corresponding to a predetermined electric potential has ended at the time t909, and the ramp signal Vramp is reset to the initial value. However, the electric potential of the ramp signal Vramp+ input to the comparator 801 has an offset with respect to the ramp signal Vramp, which is added by the adder 804 corresponds to the electric potential held by the MEM 803 at the time t908.

In addition, output of the count value held by the CNT 802 of each column to the outside of the image sensing element is started by a horizontal transfer pulse PH output from the HSR 111.

2-3. Pixel Signal Readout 2

Next, from time t910, AD conversion of the second sum signal is performed. First, in the period from the time t910 to t911, a transfer pulse PTX2 changes to Hi, and the charges of the second pixel signal are transferred so as to be added to the FD that holds the first sum signal. The vertical signal line potential Vline becomes an electric potential corresponding to the second sum signal. In the period from the time t911 to t913, the DAC 106 outputs the ramp signal Vramp, and the ramp signal Vramp+ as an electric potential that has passed through the adder 804 is input to the comparator 801 to perform AD conversion of the second sum signal. At this time, since the start potential of the ramp signal Vramp+ is the electric potential corresponding to the first sum signal, the difference between the second sum signal and the start potential of the ramp signal Vramp+ corresponds to the second pixel signal. The CNT 802 operates by an amount corresponding to the second pixel signal that is the difference.

The CNT 802 performs the count operation during the period from the time t911 to t912 at which the vertical signal line potential Vline and the ramp signal Vramp+ match. When generation of a predetermined electric potential by the ramp signal Vramp has ended at the time t913, the ramp signal Vramp is reset to the initial value. In addition, output of the count value held by the CNT 802 of each column to the outside of the image sensing element is started by the horizontal transfer pulse PH output from the HSR 111, and the readout of the selected row ends.

Pixel signal readout driving according to the second embodiment has been described above.

3. Output Correction Operation

An operation method of calculating the first pixel signal and the second pixel signal of each pixel from a digital value obtained by the above-described driving will be described next. As in the first embodiment, the output from the image sensing element is sent to an image capturing signal processing circuit 406 and undergoes an operation.

In this embodiment, the image capturing signal processing circuit 406 subtracts a reset signal N from a first sum signal N+Sa, thereby obtaining a first pixel signal Sa. In addition, since the AD conversion output of the second sum signal corresponds to a second pixel signal Sb, the second pixel signal Sb can be obtained by directly using the AD conversion output.

The output correction operation method according to the second embodiment has been described above.

According to this embodiment, when AD-converting the second sum signal, the start potential of the ramp signal Vramp can be set to an electric potential corresponding to the first sum signal on a pixel basis. Since the count operation can be optimized on a pixel basis, unlike the first embodiment in which the count operation is optimized on a row basis, power consumption can further be reduced.

In the second embodiment as well, the image sensing element may incorporate memories and a difference circuit, and the operation outside the image sensing element may be simplified.

Third Embodiment

The first embodiment has been described assuming that the driving of the first embodiment is performed for all pixels without distinction. On the other hand, in an image sensing element including optical black pixels (to be referred to as OB pixels hereinafter) capable of obtaining a black level by covering some pixels with pixel wiring or the like and thus shielding light, the OB pixels always output the black level independently of the object. In driving according to the first embodiment, if an OB pixel exists in a selected row, the initial value of the reference signal when AD-converting the second sum signal is rate-determined by the black level of the OB pixel and never becomes the initial value according to the first sum signal in a normal pixel. It is therefore impossible to reduce power consumption. A measure against this will be described with reference to FIG. 10.

A dotted line portion 1000 in FIG. 10 indicates a pixel array formed from OB pixels. An OB pixel 1001 has the same arrangement as that described with reference to FIG. 2 except that the upper portion of each photodiode forms a light-shielding portion.

An RCNT 1005 that is the same circuit as the RCNT 105 corresponding to the OB pixel array 1001 and a DAC 1006 that is the same circuit as the DAC 106 are added to the arrangement of the first embodiment.

In this arrangement, for the OB pixel, the result of AD conversion of the first sum signal is not fed back to AD conversion of the second sum signal. Instead, the first sum signal and the second sum signal are AD-converted using the RCNT 1005 and the DAC 1006, as in AD conversion of a reset signal. As for the output of the OB pixel, the reset signal readout output is subtracted from the first sum signal readout output, thereby obtaining the first pixel signal. The first sum signal readout output is subtracted from the second sum signal readout output, thereby obtaining the second pixel signal.

As described above, when the OB pixels and the normal pixels are AD-converted using different DACs, the start potential of the reference signal when AD-converting the second sum signal of a normal pixel is prevented from being rate-determined by the OB pixel, and high-speed AD conversion with low power consumption can be performed.

Fourth Embodiment

In the first embodiment, the RCNT 105, the CNT 107, and the Mcnt 110 equally handle n bits. On the other hand, the number of bits handled by the DAC 106 need not always be the same as the number of bits handled by the CNT 107 and the Mcnt 110 because the DAC 106 converts a digital signal into an analog signal and then outputs the analog signal smoothed by a low-pass filter. The number of bits handled by the RCNT 105 may be smaller than the number of bits handled by the CNT 107 and the Mcnt 110. When this arrangement is applied to the first embodiment, a bit accuracy difference is generated between the digital value held by the Mcnt 110 and the digital value held by the Mramp 109 when the first sum signal is AD-converted. For this reason, an error may occur when AD-converting the second sum signal.

Figure 11:
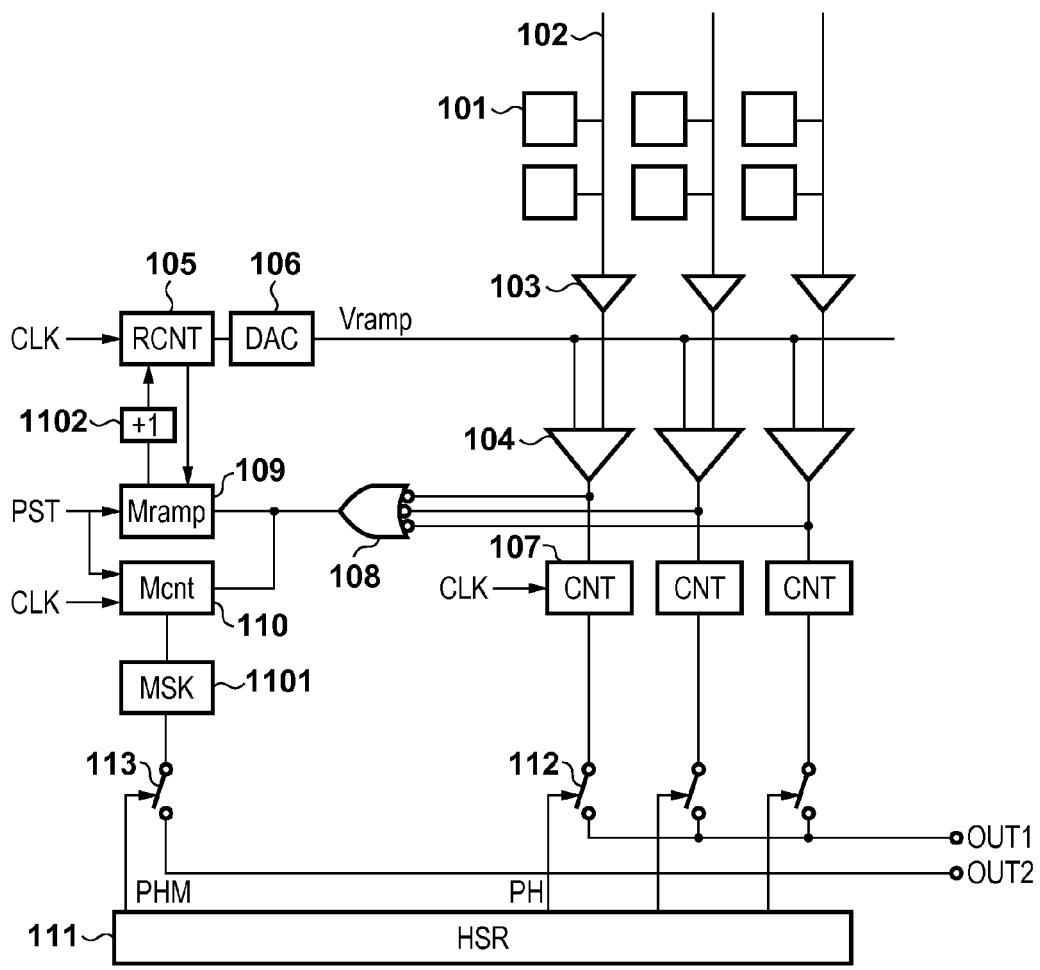
FIG. 11 is a block diagram of the arrangement of a solid-state image sensing element according to the fourth embodiment.

In the fourth embodiment, an arrangement that includes a measure against the above-described problem will be described with reference to FIG. 11. FIG. 11 is a circuit diagram of an image sensing element according to the fourth embodiment. Here, an RCNT 105 handles m bits, and a CNT 107 and an Mcnt 110 handle (m+2) bits.

In FIG. 11, a circuit MSK 1101 that is connected to the output of the Mcnt 110 and replaces two lower bits of the value held by the Mcnt 110 with 0 is added to the circuit diagram according to the first embodiment described with reference to FIG. 1. Also added is a circuit 1102 that is formed between an Mramp 109 and the RCNT 105 and adds 1 when the value held by the Mramp 109 is set to the initial value of the RCNT 105.

Figure 12:
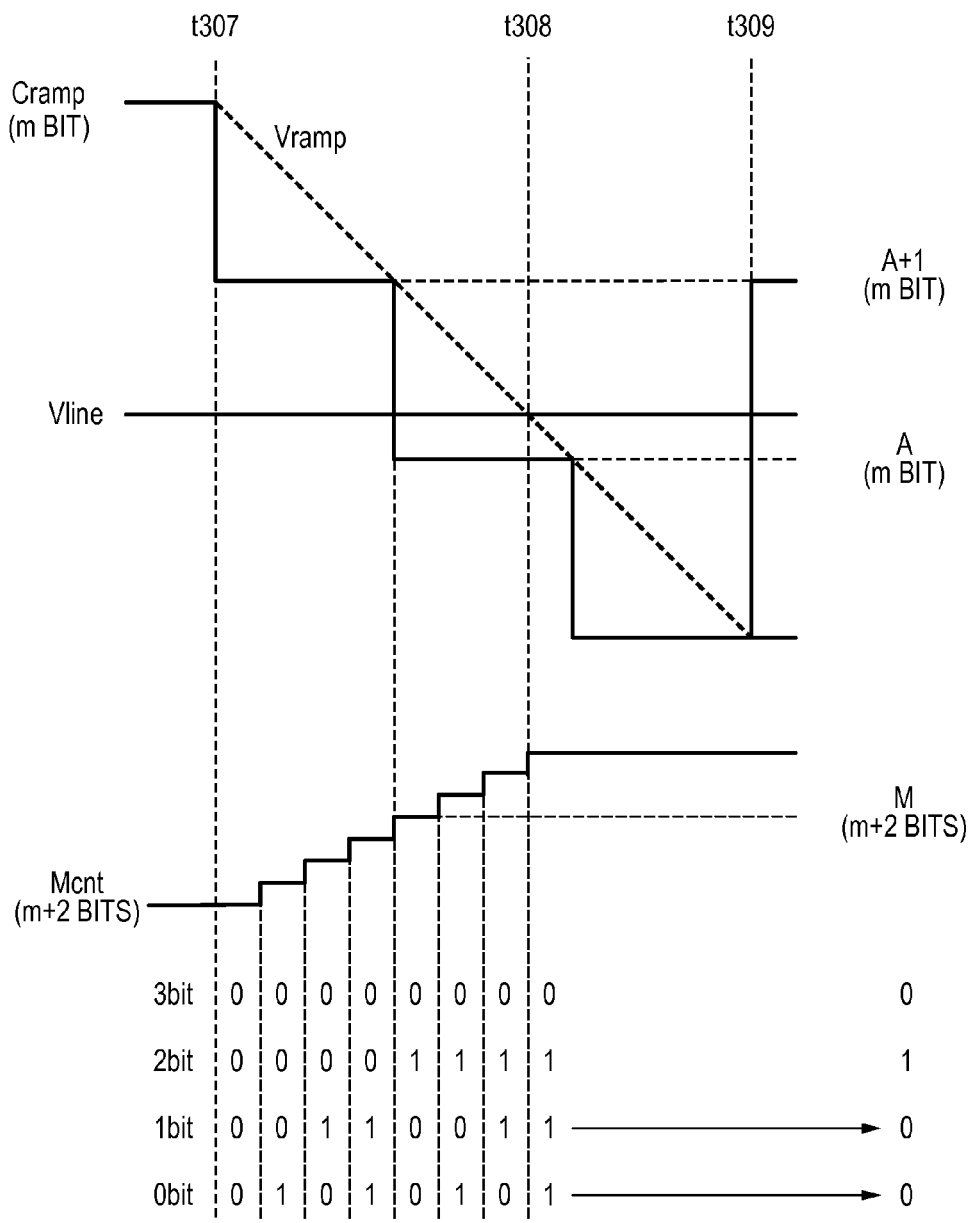
FIG. 12 is a timing chart showing an example of driving of the solid-state image sensing element according to the fourth embodiment.

A detailed driving example by the above arrangement will be described next with reference to FIG. 12. FIG. 12 is a timing chart according to this embodiment, which corresponds to the period from time t307 to t309 in FIG. 3. FIG. 12 shows a vertical signal line potential Vline, the electric potential of a ramp signal Vramp, and the count values of the RCNT 105 and the Mcnt 110.

In the period from the time t307 to t309, a DAC 106 outputs the ramp signal Vramp to perform AD conversion of a first sum signal. The Mcnt 110 performs the count operation during the period from the time t307 to the time t308 at which the vertical signal line potential Vline and the ramp signal Vramp match. At the time t308 at which the vertical signal line potential Vline and the ramp signal Vramp match, the Mramp 109 holds Cramp (A in FIG. 12) at the time t308, and the Mcnt 110 holds the count value at the time t308. At this time, the MSK 1101 holds a value (0100) obtained by replacing two lower bits of the count value (0111) held by the Mcnt 110 with 0.

At the time t309, a value obtained by adding 1 to the value held by the Mramp 109 becomes the initial value of the RCNT 105. Next, the same AD conversion of a second sum signal as in the first embodiment is performed. The rest of the driving method and the correction operation are the same as in the second embodiment.

As described above, when the circuit 1102 adds 1 to Cramp held by the Mramp 109, a value corresponding to the output of the MSK 1101 obtained by replacing two lower bits with 0 can be set to the initial value of the reference signal when AD-converting the second sum signal. In addition, when the MSK 1101 replaces the two lower bits with 0, the accuracy of bits handled by the Mcnt 110 can equal Cramp, and an error caused by the bit accuracy difference can be eliminated.

With the above arrangement, the effects of the present invention can be obtained even when the RCNT 105, the CNT 107, and the Mcnt 110 handle different numbers of bits.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-041942, filed Mar. 4, 2014, which is hereby incorporated by reference herein in its entirety.

What is claimed is:

1. A solid-state image sensor comprising:
a plurality of pixels each of which includes a plurality of photoelectric conversion portions and outputs a first signal and a second signal; and
an AD converter which converts an analog signal output from each of the plurality of pixels into a digital signal, wherein the AD converter includes a reference signal generator which generates a reference signal whose electric potential varies with a predetermined slope as a time elapses, and a comparator which compares the reference signal and the analog signal output from each of the plurality of pixels,
wherein AD conversion of the second signal is controlled in accordance with an AD conversion result of the first signal by the AD converter and a value according to the reference signal at a timing at which the output of the comparator has varied when AD-converting the first signal is set to an initial value of the reference signal input to the comparator when AD-converting the second signal, and
wherein the first signal is based on first charges generated by at least one of the photoelectric conversion portions of each pixel, and the second signal is based on the first charges and second charges generated by at least one of the remaining photoelectric conversion portions of the each pixel.

2. The sensor according to claim 1, wherein a value according to the reference signal at a timing at which the output of the comparator has varied earliest in a selected row when AD-converting the first signal is set to the initial value of the reference signal input to the comparator when AD-converting the second signal.

3. The sensor according to claim 1, wherein a value that further has an offset corresponding to a predetermined electric potential with respect to the value according to the reference signal at the timing at which the output of the comparator has varied when AD-converting the first signal is set to the initial value of the reference signal input to the comparator when AD-converting the second signal.

4. A method of controlling a solid-state image sensor including a plurality of pixels each of which includes a plurality of photoelectric conversion portions and outputs a first signal and a second signal, and
an AD converter which converts an analog signal output from each of the plurality of pixels into a digital signal, wherein the AD converter includes a reference signal generator which generates a reference signal whose electric potential varies with a predetermined slope as a time elapses, and a comparator which compares the reference signal and the analog signal output from each of the plurality of pixels, the method comprising:
controlling AD conversion of the second signal in accordance with an AD conversion result of the first signal by the AD converter,
wherein a value according to the reference signal at a timing at which the output of the comparator has varied when AD-converting the first signal is set to an initial value of the reference signal input to the comparator when AD-converting the second signal, and
wherein the first signal is based on first charges generated by at least one of the photoelectric conversion portions of each pixel, and the second signal is based on the first charges and second charges generated by at least one of the remaining photoelectric conversion portions of the each pixel.

5. The method according to claim 4, wherein a value according to the reference signal at a timing at which the output of the comparator has varied earliest in a selected row when AD-converting the first signal is set to the initial value of the reference signal input to the comparator when AD-converting the second signal.

6. The method according to claim 4, wherein a value that further has an offset corresponding to a predetermined electric potential with respect to the value according to the reference signal at the timing at which the output of the comparator has varied when AD-converting the first signal is set to the initial value of the reference signal input to the comparator when AD-converting the second signal.

7. A non-transitory computer-readable storage medium storing a program that causes a computer to execute each step of a method of controlling a solid-state image sensor including a plurality of pixels each of which includes a plurality of photoelectric conversion portions and outputs a first signal and a second signal, and an AD converter which converts an analog signal output from each of the plurality of pixels into a digital signal, wherein the AD converter includes a reference signal generator which generates a reference signal whose electric potential varies with a predetermined slope as a time elapses, and a comparator which compares the reference signal and the analog signal output from each of the plurality of pixels, the method comprising:
controlling AD conversion of the second signal in accordance with an AD conversion result of the first signal by the AD converter,
wherein a value according to the reference signal at a timing at which the output of the comparator has varied when AD-converting the first signal is set to an initial value of the reference signal input to the comparator when AD-converting the second signal, and
wherein the first signal is based on first charges generated by at least one of the photoelectric conversion portions of each pixel, and the second signal is based on the first charges and second charges generated by at least one of the remaining photoelectric conversion portions of the each pixel.

8. The sensor according to claim 1, wherein each pixel further includes a charge/voltage conversion portion shared by the plurality of photoelectric conversion portions, and a plurality of transfer portions configured to transfer charges generated by the plurality of photoelectric conversion portions to the charge/voltage conversion portion.

9. The method according to claim 4, wherein each pixel further includes a charge/voltage conversion portion shared by the plurality of photoelectric conversion portions, and a plurality of transfer portions configured to transfer charges generated by the plurality of photoelectric conversion portions to the charge/voltage conversion portion.

* * * * *